United States Patent [19]

Laurent et al.

[11] 4,015,233

[45] Mar. 29, 1977

[54] PRESSURE SENSOR OF LOW SENSITIVITY WITH RESPECT TO ACCELERATION

[75] Inventors: Jean Laurent, St. Germain-en-Laye; Francois Villain, Soustons, both of France

[73] Assignee: Institut Français du Petrole, des Carburants et Lubrifiants et Entreprise de Recherches et d'Activities Petrolieres Elf, France

[22] Filed: Mar. 21, 1974

[21] Appl. No.: 453,499

[30] Foreign Application Priority Data

Mar. 27, 1973 France ............................ 73.11249

[52] U.S. Cl. .................................. 340/10; 310/8.2; 340/8 S

[51] Int. Cl.[2] ........................................ H04B 13/00

[58] Field of Search .......... 340/7, 10, 98 R, 8 MM, 340/8 FT, 8 S, 9, 11, 12, 13; 29/594, 595, 25.35; 310/8.2, 9.1, 9.4

[56] References Cited

UNITED STATES PATENTS

| | | | |
|---|---|---|---|
| 3,113,287 | 12/1963 | Renner | 340/10 X |
| 3,187,300 | 6/1965 | Brate | 340/10 |
| 3,263,208 | 7/1966 | Douglas et al. | 340/8 |
| 3,266,011 | 8/1966 | Massa | 340/10 X |
| 3,277,436 | 10/1966 | Fitzgerald | 340/10 |
| 3,283,294 | 11/1966 | Schrom | 340/7 R |
| 3,284,760 | 10/1966 | Maes | 340/10 |
| 3,284,761 | 11/1966 | Douglas | 340/10 |
| 3,368,193 | 2/1968 | McQuitty et al. | 340/10 |
| 3,660,809 | 5/1972 | Pearson | 340/10 |
| 3,732,446 | 5/1973 | Bryant | 310/9.4 |
| 3,763,464 | 10/1973 | Laurent | 340/10 |
| 3,832,762 | 9/1974 | Johnston | 340/10 X |

*Primary Examiner*—Harold Tudor
*Attorney, Agent, or Firm*—Craig & Antonelli

[57] ABSTRACT

Pressure sensor comprising a rigid tubular element housing an elongated support member, solid or fixed with the sensitive element in the vicinity of one of its end portions, said support element being made of a deformable material and comprising an enlargement shifted or extended with respect to said end portions and in contact with the internal surface of the tubular element.

8 Claims, 5 Drawing Figures

PRESSURE SENSOR OF LOW SENSITIVITY WITH RESPECT TO ACCELERATION

Figure 1:
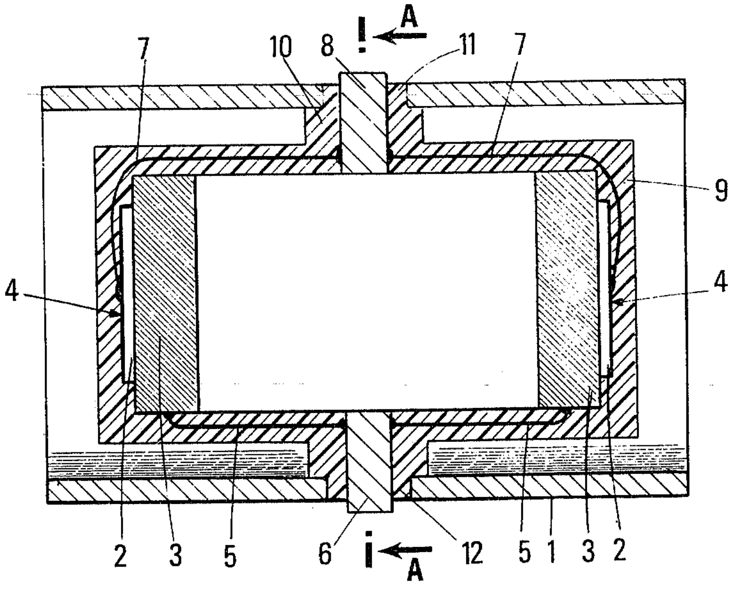

The invention relates to a pressure sensor which may be used in particular for subwater seismic prospecting and whose sensitivity to accelerations is reduced by use of a particular arrangement of each constituting element.

For the seismic prospection at sea, particularly, there is used a great number of pressure sensors or hydrophones housed at regular intervals in a pipe sheath of great length (called seismic streamer) drawn behind a ship. These hydrophones detect the waves generated in the vicinity of the ship by means of a pressure wave generator and which are reflected from the different subsurface layers.

To the useful signals produced by the hydrophones, are superimposed the "noise" signals of various origins.

The noise generated by the hydrophones is mainly due to the accelerations to which they are subjected when the seismic streamer which contains them is drawn underwater from the ship. The noise frequency band (in the order of 5 to 20 Hz) is particularly troublesome when it coincides with the interesting portion of the frequency spectrum which has to be usefully detected.

A known way for ensuring the compensation of the accelerations consists in providing a hydrophone with two sensitive elements placed perpendicularly to the vibration axis and so connected that the electric voltages induced by the deformations be in opposite directions and cancel each other.

The main inconvenience of this type of hydrophone lies in the fact that, in practice, it is very difficult to conveniently adjust the sensitive elements in order to obtain a complete compensation.

It is an object of this invention to provide a pressure sensor having a high sensitivity to the pressure waves and a low sensitivity to accelerations, and whose construction and assembling are simple and not expensive.

The sensor comprises at least one pressure sensing element, a rigid tubular element and an elongated support element contained in said tubular element and having a section smaller than the latter over the most part of its length.

The sensitive element is solid or fixed with the support element in the vicinity of one of its end parts. The latter comprises at least one part made of deformable material, provided with an enlarged portion shifted or extended with respect to the end part solid or fixed with the sensitive element and in contact with the internal surface of the sensitive element.

By this way, the stresses which can be exerted on the rigid element are transferred to only one portion of the support element, which is different from that to which is secured the sensitive element, and not directly to the latter. The deformable material of which is formed the second part of the support element also acts as a dampener for the vibrations which can be transferred through the rigid element.

Figure 2:
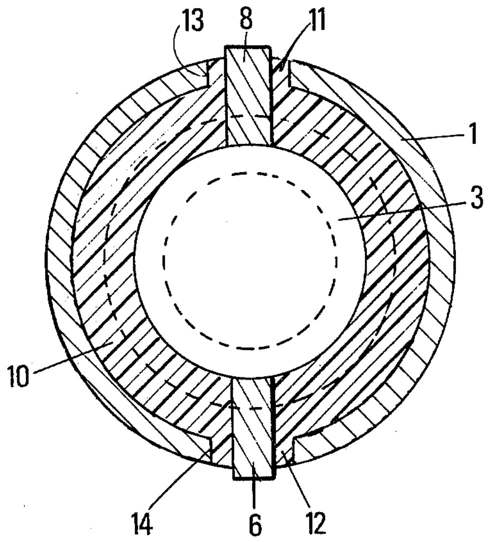
Figure 3:
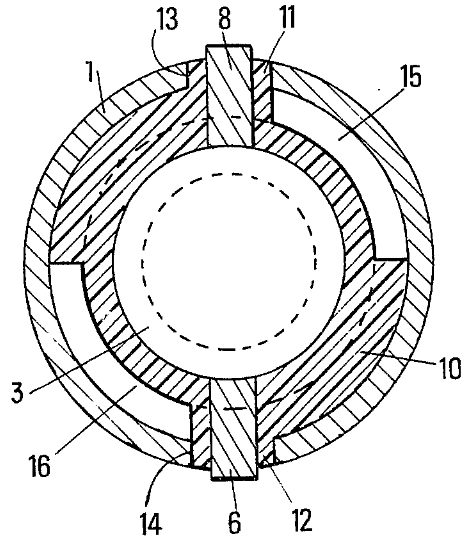
Figure 4:
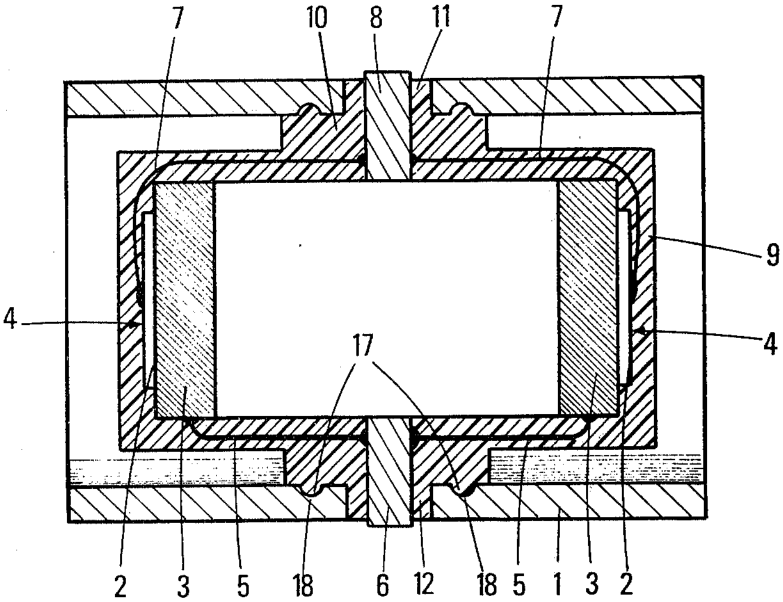
Figure 1A:
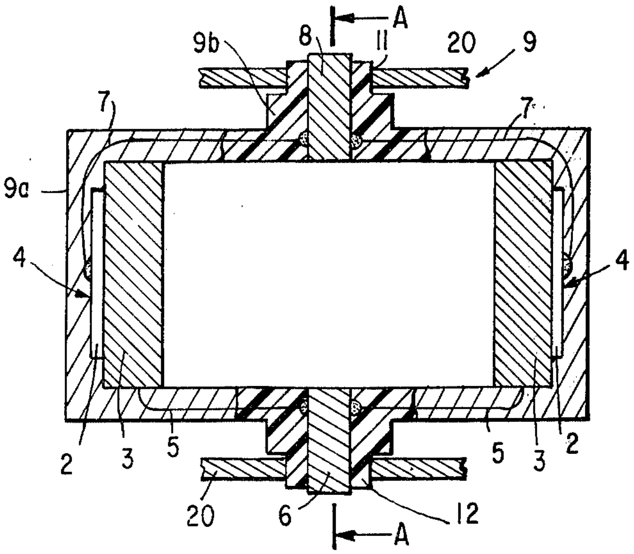

Other peculiar features and advantages of the invention will be better understood from the following description of a non-limitative embodiment of the device, illustrated by the accompanying drawings, in which:

FIG. 1 diagrammatically shows a cross-section of the pressure sensor provided with two sensitive elements, FIG. 1*a* diagrammatically shows a cross-section of a further embodiment of the pressure sensor provided with two sensitive elements, FIG. 2 diagrammatically shows a cross-section along A—A of the embodiment of FIG. 1, FIG. 3 diagrammatically shows a cross-section along A—A of a modification of the embodiment illustrated in FIG. 1, and FIG. 4 diagrammatically shows a modification of the device of FIG. 1.

The hydrophone shown in FIGS. 1 and 2 is obtained by assembling elements in association with a seismic streamer (not shown), through a rigid cylindrical body 1 opened at its ends and made of metal or plastic material. The hydrophone comprises, preferably, two sensitive elements 2 consisting for example of thin ceramic disks having piezoelectric properties.

Each sensitive element adheres by one of its faces to a disk 3 of conducting material forming the first electrode. A thin metal layer 4 is provided on the upper face of each sensitive element and forms a second electrode. The disks 3 are connected through conductors 5 to a first metallic terminal 6. The metal layers 4 are connected through conductor 7 to a second metallic terminal 8 placed for example, in the extension of the first one.

The use of two sensitive elements and their connection in parallel makes it possible, as it is already known, to compensate at least partly the acceleration to which the sensor is subjected along a direction perpendicular to the side faces of both elements.

The assembly formed by the sensitive elements 2, provided with their electrodes 3, 4 and the conductors 5 and 7, is embedded in a closed sheath 9 made of a flexible material, for example, polyurethane. This sheath is substantially cylindrical over its whole length and its diameter is smaller than the internal diameter of the body 1 except in its medium portion where it comprises an enlargement 10 substantially annular whose external surface takes its bearing on the internal surface of said body. The enlargement 10 of the sheath 9 also comprises two bosses 11 and 12 having the same axis as the terminals 6 and 8 and adapted to penetrate two orifices 13 and 14 provided in the side wall of the cylindrical body. The latter is placed in the seismic streamer and the pressure waves are transferred to the sensitive elements through the liquid contained therein. Since the sensitive elements are placed in the vicinity of the end portions of the flexible sheath 9, laterally distant from enlargement 10, as seen in FIG. 1 they are not subjected to the stresses which may be applied to the enlarged medium portion through the intermediary of the rigid cylindrical body 1.

In addition, the vibrations generated by longitudinal and transverse accelerations to which the hydrophone is subjected when the seismic streamer containing the same is drawn in water, are substantially dampened by the flexible material of which the sheath is made.

In the modified embodiment illustrated in FIG. 3, the annular enlargement 10 is hollow, for example along two sectors 15 and 16 in opposite directions, in order to decrease the contact surface between the cylindrical body 1 and the sheath 9 and accordingly, to decrease the transfer to the sensitive elements of the stresses and accelerations.

The modified embodiment illustrated in FIG. 4, comprises similar elements as those shown in FIG. 1. It differs from the first embodiment only by the shape of the annular enlargement 10. As a matter of fact, the latter comprises two annular bosses 17 which are introduced when assembling the device, into two annular grooves 18 provided in the internal wall of the cylindrical body 1.

In order to make easier the assembly, the body 1 will consist of two identical parts which are connected in the vicinity of the medium plane of sheath 9.

Other modified embodiments can be used without departing from the scope of the invention. It is possible, for example, as illustrated in FIG. 1*a*, to make the sheath 9 in two parts 9*a* and 9*b*, one of uncompressible material, solid or fixed with the sensitive elements, the other of flexible material absorbing the vibrations and comprising the enlargement substantially adapted to the internal diameter of the cylindrical body 1.

It will also be possible to omit the rigid body and secure the sheath 9 directly to the rigid supports 20 associated to the sheath of the seismic streamer.

The above-described embodiment is not limitative of the scope of the invention. It will be also possible to replace the couple of sensitive elements by a single element. It will also be embedded in a sheath of elastic material taking its bearing in the cylindrical body and on a rigid support associated to the sheath of the seismic streamer in a portion thereof different from that where is placed the sensitive element.

We claim:

1. A pressure sensing device comprising a rigid tubular member, an elongated dampening support member of a flexible deformable material, said support member including a projecting portion at approximately the central portion of the longitudinal dimension of said elongated support member, said projecting portion being secured to said rigid tubular member for dampening vibrations from said rigid tubular member, and said support member including two further dampening portions, each of said two further dampening portions having a smaller cross-section than that of said projecting portion, and each of two further dampening portions extending inside said rigid tubular member from opposite sides of said projecting portion to opposite ends of said elongated support member, sensing means including two sensing elements each provided with electrodes, each of said two sensing elements being supported by respective ones of said two further dampening portions at respective opposite ends of said elongated support member, each of said opposite ends of said elongated support member being laterally distant from said projecting portion, and metal terminals arranged within said projecting portion, said metal terminals being operatively connected with said electrodes of said two sensing elements.

2. A device according to claim 1, wherein said elongated support member forms an enclosure for both of said two sensing elements.

3. A device according to claim 1, wherein said projecting portion is the sole support of said support member with said rigid tubular member.

4. A device according to claim 1, wherein said elongated support member is cylindrical and said projecting portion includes an annular flange portion projecting outwardly from the cylindrical support member.

5. A device according to claim 4, wherein said annular flange portion includes at least two bosses extending respectively through at least two orifices of said rigid tubular member.

6. A device according to claim 5, wherein said metal terminals include two terminals each respectively extending through said two bosses.

7. A device according to claim 4, wherein said annular flange portion further includes two annular bosses, each of said two annular bosses being contained within two annular grooves included in a surface of said rigid tubular member facing said support member.

8. A pressure sensing device comprising a rigid tubular member having an internal wall, an elongated dampening support member, said support member including at least a projecting portion of a flexible deformable material, said projecting portion including at least two annular sectors projecting from said support member and engaging said internal wall of said rigid tubular member for dampening vibrations from said rigid tubular member, said two annular sectors being annularly separated from one another, and said support member including at least one further dampening portion having a cross-section smaller than that of said annular sectors, said at least one further dampening portion laterally extending inside said rigid tubular member from said two annular sectors, and sensing means provided with electrodes, said sensing means being supported by said at least one further dampening portion an an end position of said support member laterally distant from said two annular sectors.

* * * * *

UNITED STATES PATENT AND TRADEMARK OFFICE

CERTIFICATE OF CORRECTION

PATENT NO. : 4,015,233

DATED : March 29, 1977

INVENTOR(S) : Jean Laurent, et al

It is certified that error appears in the above-identified patent and that said Letters Patent are hereby corrected as shown below:

Title page, (73) Assignee, which now reads:

"(73) Assignee: Institut Francais du Petrole, des Carburants et Lubrifiants et Entreprise de Recherches et d'Activities Petrolieres Elf, France"

should read:

-- (73) Assignee: Institut Francais du Petrole, France --

Signed and Sealed this

*Nineteenth* Day of *June 1979*

[SEAL]

*Attest:*

RUTH C. MASON
*Attesting Officer*

DONALD W. BANNER
*Commissioner of Patents and Trademarks*